United States Patent
Niemoller et al.

(10) Patent No.: US 7,469,252 B2
(45) Date of Patent: Dec. 23, 2008

(54) DEVICE, SYSTEM AND/OR METHOD FOR PROVIDING SCHEMA-INDEPENDENT ACCESS TO OBJECT IN DOCUMENTS

(75) Inventors: David C. Niemoller, Reston, VA (US); Andrew T. Bove, Gaithersburg, MD (US)

(73) Assignee: Fortinet, Inc., Sunnyvale, CA (US)

( * ) Notice: Subject to any disclaimer, the term of this patent is extended or adjusted under 35 U.S.C. 154(b) by 222 days.

(21) Appl. No.: 11/606,209

(22) Filed: Nov. 30, 2006

(65) Prior Publication Data
US 2008/0134016 A1    Jun. 5, 2008

(51) Int. Cl.
G06F 7/00    (2006.01)
(52) U.S. Cl. .................................. 707/100
(58) Field of Classification Search .......... 707/100–102
See application file for complete search history.

(56) References Cited

U.S. PATENT DOCUMENTS

| 5,806,066 | A | 9/1998 | Golshani et al. ............ 707/100 |
| 6,772,180 | B1 | 8/2004 | Li et al. ..................... 707/100 |
| 2006/0173868 | A1* | 8/2006 | Angele et al. ............... 707/100 |
| 2007/0041035 | A1* | 2/2007 | Sembower et al. ......... 358/1.15 |
| 2007/0299799 | A1* | 12/2007 | Meehan et al. ................ 706/46 |

* cited by examiner

*Primary Examiner*—Wilson Lee
(74) *Attorney, Agent, or Firm*—Schwegman, Lundberg & Woessner, P.A.

(57) ABSTRACT

A computer system supports the access of documents formatted according to different schemas. A model includes a relationship for different schemas. The relationship specifies a particular data and, corresponding to the particular data and one of the different schemas, a reference to one or more ontological-elements(s). An ontological-element defines a semantic relationship between the particular data (as subject) and objects with regard to a semantic relationship in documents. An executable program can include instructions or queries to access the particular data in a one or more documents. To access the particular data in the document, the executable program can access the model to obtain the reference to the ontological-elements corresponding to the particular data and the various schema for the various documents can refer to ontological-elements corresponding to the particular semantic relationships among the data, the ontological-elements further specifying one or more objects corresponding to the particular data; and can access objects in the particular documents as specified by ontological-elements.

22 Claims, 6 Drawing Sheets

DEVICE, SYSTEM AND/OR METHOD FOR PROVIDING SCHEMA-INDEPENDENT ACCESS TO OBJECT IN DOCUMENTS

FIELD OF THE INVENTION

The present invention relates in general to document processing, and more specifically to accessing documents according to a pre-defined format.

BACKGROUND OF THE INVENTION

An organization can utilize many different documents, some of which are formatted according to different schemas. Schemas specify a syntactic relationship, structure, and element and attribute names by which documents can be interpreted. The extensible markup language (XML) standard provides a common example of a schema.

Schemas impose a set of constraints. Schemas typically restrict, for example, element and attribute names and their allowable containment hierarchies. For example, a particular schema might only allow an element named "birthday" to contain one element named "month" and one element named "day;" the "month" element's character data may be defined as being confined to the choices 'JAN', 'FEB' . . . , 'NOV', 'DEC' according to a particular schema language's conventions, perhaps meaning that it must not only be formatted in this way, but also must not be processed as if it were some other type of data. An attempt to reference a "birthday" containing an element named "date" in that schema might fail.

Typically, an application program interface (API) which accesses a document has been written with the assumption that a particular schema is associated with the documents that are of interest to the API. An organization may have great numbers of documents formatted according to different schemas. A document formatted according to one schema may not necessarily be properly interpreted by an API that was written assuming a different schema.

Compounding this problem is that different organizations may use sets of schemas which differ greatly from other organizations' schemas for conceptually analogous or related documents. Moreover, even within an organization, variations of schemas can be used, such as for particular languages (English, French, etc.) or different customers.

The Document Object Model (DOM) is an attempt to provide one API for accessing XML documents which crosses all schemas. A DOM implementation presents an XML document as a tree structure, or allows a software application to build an XML document tree structure from scratch. However, this does not solve the problem that there are documents which exist with different schemas.

SUMMARY OF THE INVENTION

Accordingly, one or more embodiments of the present invention provide a computer system and/or computer-implemented method supporting the access of documents, wherein a document can be formatted according to one of plural different schemas, wherein a schema specifies at least syntactic relationships, structure, and element and attribute names by which to interpret documents. The computer system can include a model configured to include a relationship for two or more different schemas, wherein the relationship is configured to specify a particular data and, corresponding to the particular data and one of the different schemas, a reference to one or more triplets, wherein the triplet(s) define a semantic relationship between the particular data as subject and objects in documents. The computer system also includes a processor configured with an executable program, wherein the executable program includes instructions to access the particular data in a document, the document being formatted according to the schema. To access the particular data in the document, the executable program: accesses the model to obtain the reference to the triplet(s) corresponding to the particular data and the schema; refers to the triplet(s) corresponding to the particular data, the triplet(s) further specifying the objects corresponding to the particular data; and accesses the objects in the particular document as specified by the triplet(s).

Further, one or more embodiments provide a computer-readable storage medium comprising instructions for execution by a computer, the instructions including a computer-implemented method for supporting the access of documents, wherein a document can be formatted according to one of plural different schemas, wherein a schema specifies syntactic relationships, structure, and element and attribute names by which to interpret a document. The instructions implement accessing a particular data in a document, the document being formatted according to one of the different schemas. Accessing the particular data in the document includes accessing a model to obtain a reference to a ontological-element corresponding to the particular data and one of the different schemas, the model including a relationship for two or more different schemas, wherein the relationship is configured to specify a particular data and, corresponding to the particular data and one of the different schemas, a reference to one or more ontological-elements, wherein the ontological-element(s) define a semantic relationship between particular data as subject and objects in documents; referring to the ontological-element(s) corresponding to the particular data, the ontological-element(s) further specifying the objects corresponding to the particular data; and accessing the objects in the particular document as specified by the ontological-element(s).

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

In overview, the present disclosure concerns information structures commonly known as schemas, which describe the structure of documents for a class of documents, such as a possible arrangement of tags and text in a valid document, such as may be associated with, for example, an extensible markup language document (XML) or the like. Such schemas may have constraints that specify syntactic relationships, that is, the valid syntax used in a document according to the schema; structure, that is, order and sequence of elements; and element and attribute names used in a document according to the schema. Schemas may be associated with documents, databases, or the like, such as XML documents, DDL documents, certain databases, and variations and evolutions thereof. A schema associated with a document may be utilized for any type of access of the document, including actions such as those which may be referred to as creating, updating, maintaining, modifying, searching, querying, validating, verifying, processing, storing, saving, digesting, indexing, manipulating, and the like. More particularly, various inventive concepts and principles are embodied in systems, devices, and methods therein for accessing documents formatted according to schemas.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefor, and/or application specific ICs, or a combination thereof. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to support the accessing of documents, in a manner which is independent of schemas which may be associated with the documents. In accordance with exemplary embodiments, a model is provided to support ontological constructs, including: a semantic relationship between ontological constructs and objects defined by schemas, a schema annotated with an indication of syntactic relationships for the ontological constructs, and a bridge between the syntactic and semantic relationships. By using the model, an executable program can refer to document contents by ontological constructs rather than object names, so that the same program can access documents according to different schemas, in a manner which is independent of the schemas. The term "ontological construct" is used in this context to mean a description or name for something.

Furthermore, an embodiment can provide for digesting documents, where the content of the document can be in any schema; indexing the documents; manipulating the documents; where the program accessing the documents is not necessarily specific to the schemas of those documents. Moreover, according to various embodiments, a program can refer to document contents by ontological constructs which can be unrecognized by the schema of the document, but where the program still properly accesses the document contents by bridging between a syntactic relationship for the ontological construct, to a semantic relationship with an object recognized by the schema.

Previously, programs which accessed documents were written in a manner specific to the schema associated with the documents which were of interest. Moreover, a document might refer to another document which might be structured according to yet another different schema. Previous attempts such as XML document object model (DOM) was an attempt to provide one application programming interface (API) conforming to one schema across all schemas.

Figure 1:
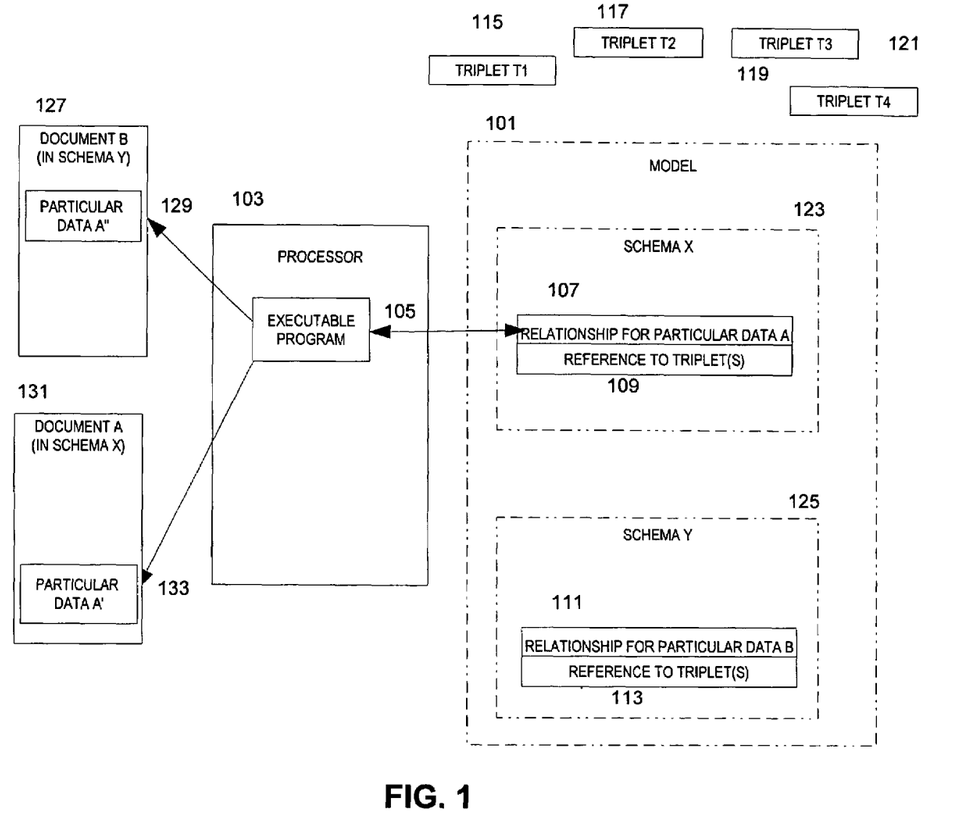
FIG. 1 is an exemplary functional block diagram illustrating schema-independent access to objects in documents.
Figure 2:
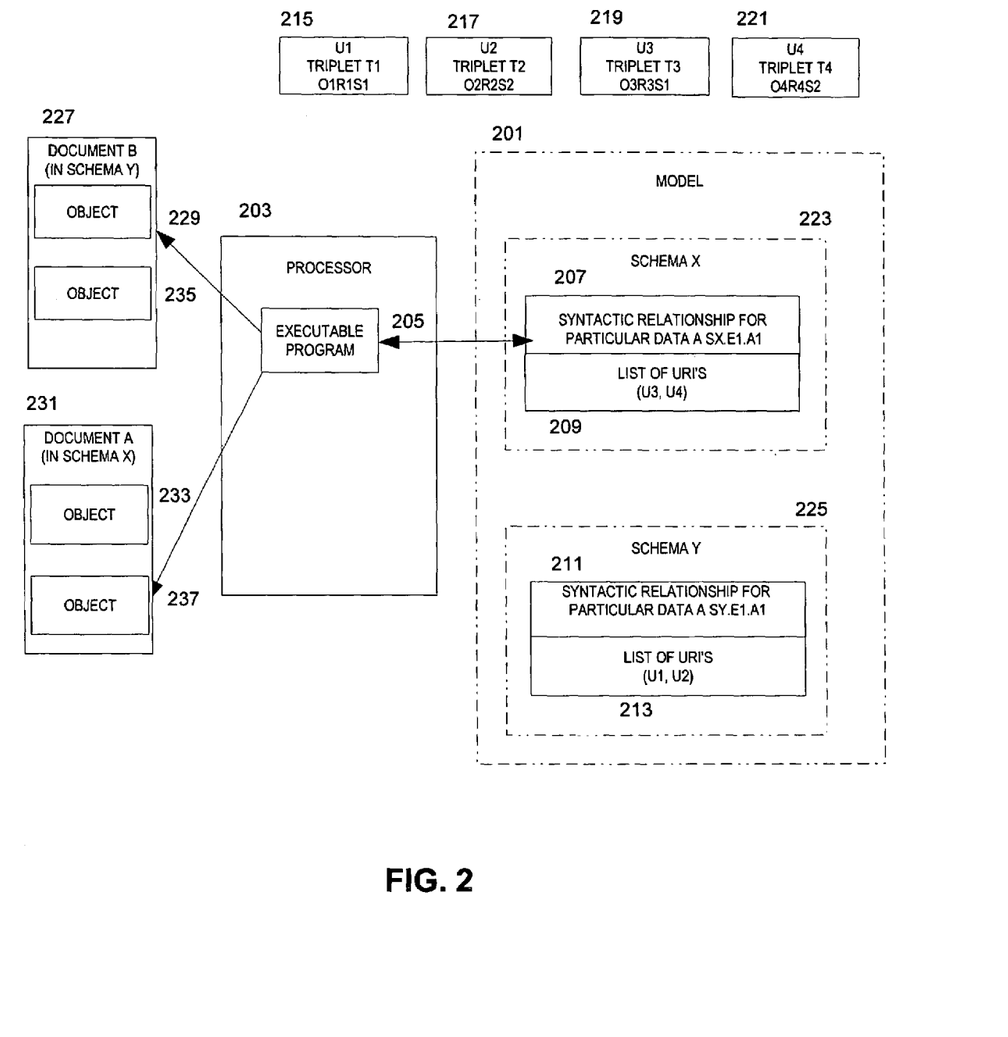
FIG. 2 is an exemplary functional block diagram illustrating an embodiment of schema-independent access to objects in documents utilizing XML.
Figure 3:
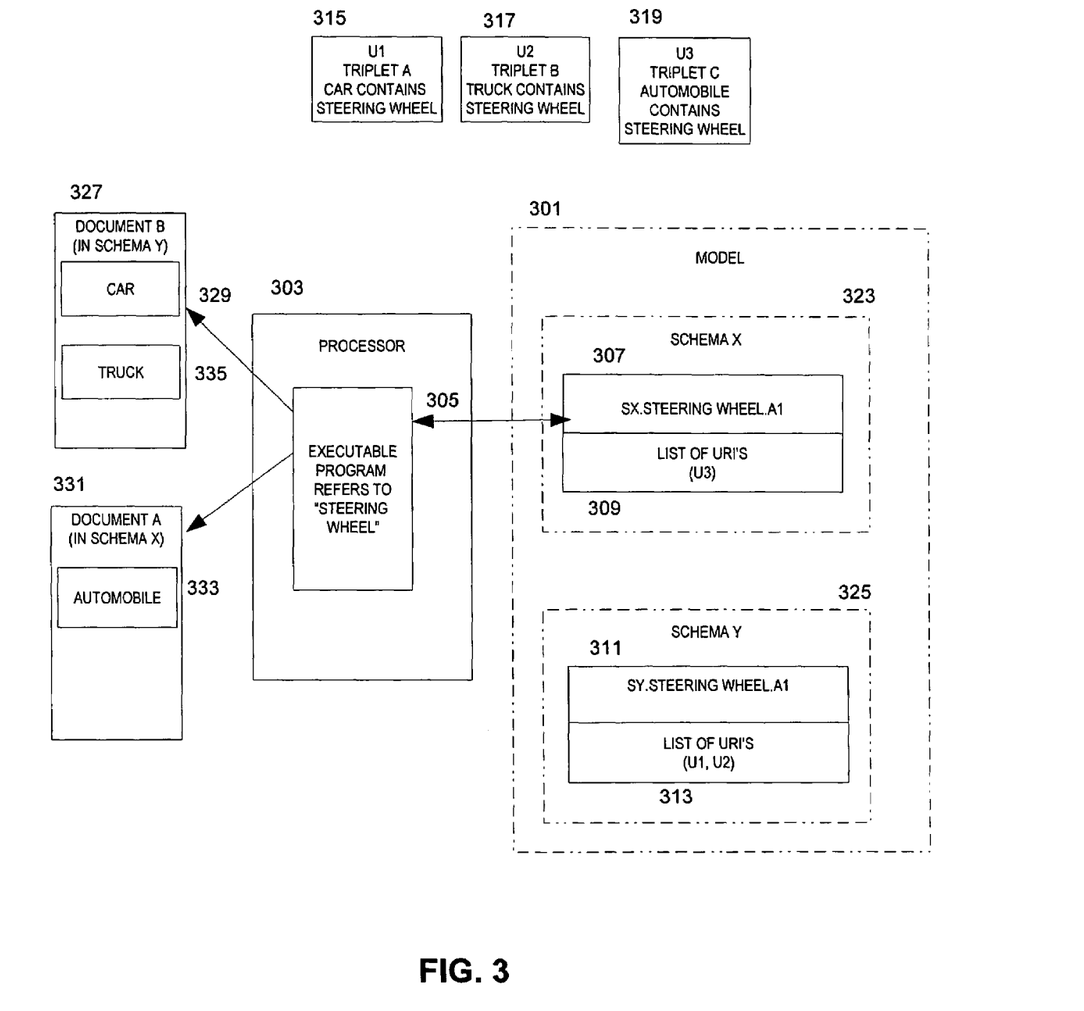
FIG. 3 is another exemplary functional block diagram illustrating another embodiment of schema-independent access to objects in documents utilizing XML.

Schema-independent access to objects in documents will be discussed with reference to FIG. 1, FIG. 2 and FIG. 3. FIG. 1 presents a high level of abstraction, FIG. 2 presents an example with respect to an XML schema, and FIG. 3 presents a more concrete example with respect to the particular data.

Referring now to FIG. 1, an exemplary functional block diagram illustrating schema-independent access to objects in documents will be discussed and described. In this illustration, there is a model 101, a processor 103, and multiple documents represented by document A 131, and document B 127. Document A is formatted according to schema X, whereas document B is formatted according to schema Y. Also illustrated are schema X 123 and schema Y 125, which are representative of multiple different schemas, where the different schemas are not fully interchangeable such that a document according to one schema might violate one or more constraints of another schema.

A conventional program (not illustrated) which desires to access an object in document A 131 can be written so as to name the object, as specified in the schema, for example, schema X 123. The conventional program has limitations, however, because it cannot necessarily properly access that object in document B 127, especially if such access would violate the constraints of schema Y 125. For example, an equivalent object in document B might have a different name.

FIG. 1 also illustrates an executable program 105. The executable program can refer to the particular data A, which is representative of any type of content to be accessed in a document.

Advantageously, the particular data A or B can be a part of an ontological construct, that is, it can describe a representation. A concrete example of an ontological construct is provided in FIG. 3. The schema might not accommodate the ontological construct; moreover, the particular data A, as it appears in a document according to a schema, might be different from the remainder of the ontological construct. In the illustrated document A 131 according to schema X, there is included a particular data A' 133, and in illustrated document B 127 according to schema Y there is included a particular data A" 129, where particular data A' 133 and particular data A" 129 can be analogous objects which nevertheless might not be recognized in the other schema. Furthermore, one or both schemas 123, 125 might not have cognizance of the particular data A per se.

In this illustration, the schemas X and Y 123, 125 can include relationships and references to one or more ontological-elements, here represented in simplified form by a relationship 107, 111, and a reference to ontological-element(s) 109, 113. The illustrated relationship 107 in schema X 123 is for a particular data A, and the illustrated relationship 111 in schema Y 125 is for a particular data B, where the executable program 105 can refer to the particular data A or B. The ontological-elements can be triplets or the like, where the triplets define semantic relationships between the particular data as subject and objects with regard to some semantic relationship among the data element classes constrained by the schemas.

An existing schema can be modified to include the relationship, in accordance with the constraints for structuring schemas. For example, an XML schema can be revised to include an annotation, within which the relationship 107, 111 and reference to ontological-element(s) 109, 113 are included.

The relationship 107, 111 can be associated with the particular data, such as particular data A or particular data B. The relationship 107, 111 can indicate a syntactic relationship of the particular data, that is, a proper structure in accordance with the applicable schema.

Each of the ontological-elements 115, 117, 119, 121 can provide a semantic relationship, that is, an indication of an object, according to one of the schemas, which is associated with the particular data, together with the particular data (as subject) and the relationship between the subject and the object.

Each of the relationships 107, 111 can be associated with a reference to one or more ontological-elements 109, 113. Thus, the reference to ontological-element(s) 109, 113 acts as a bridge from the syntactic relationship to the semantic relationship. To query particular data in the documents, the executable program can access both the schema and associated ontological-elements to satisfy the query, traversing both the structural schematic relationships as well as semantic relationships among the data elements embedded in the documents.

Thus, by traversing from the particular data referred to by the executable program 105, to the schema 123, 125 which is associated with a document to be accessed, to the relationship for the particular data 107, 111 (in the schema), to the reference to the ontological-element(s) for the particular data 109, 113, to the ontological-element 115, 117, 119, 121 indicated by the relationship, the executable program 105 can ultimately refer to the object 129, 133 expected by the schema associated with the document to be accessed. Moreover, the executable program 105 can simply refer to the particular data. The ontological-elements T1 115, T2 117, T3 119, T4 121, references to ontological-element(s) 109, 113, and/or relationships 107, 111 can be modified if desired/necessary to accommodate new and/or modified schemas and/or ontological constructs, without requiring corresponding modification to the executable program 105.

In this illustration, the model 101 does not necessarily encompass the entire schema X 123 or the entire schema Y 125, which are illustrated in broken lines. The model 101, however, includes the relationship for the particular data 107, 111, and the references to the ontological-element(s) 109, 113. In this illustrated example, the relationships for particular data 107, 111 and the references to triple(s) 109, 113 are embedded within the schema X or schema Y 123, 125; however, it will be appreciated that the relationships for particular data and the references to ontological-element(s) can be stored separately from the schemas.

Accordingly, one or more embodiments provides a computer system supporting the access of documents, wherein a document can be formatted according to one of a plurality of different schemas, wherein a schema specifies at least syntactic relationships, structure, and element and attribute names by which to interpret documents. There is a model configured to include a relationship for at least two different schemas, wherein the relationship is configured to specify a particular data and, corresponding to the particular data and one of the different schemas, a reference to at least one ontological-element, wherein the at least one ontological-element defines a semantic relationship between the particular data as subject and objects in documents. Also, there is a processor configured with an executable program, wherein the executable program includes instructions to access the particular data in a document, the document being formatted according to the one of the different schemas, wherein to access the particular data in the document. The executable program is configured to access the model to obtain the reference to the at least one ontological-element corresponding to the particular data and the one of the different schemas; refer to the at least one ontological-element corresponding to the particular data, the at least one ontological-element further specifying the objects corresponding to the particular data; and access the objects in the particular document as specified by the at least one ontological-element.

Moreover, according to one or more embodiments, there can be a plurality of particular data including the particular data, wherein the executable program includes instructions to access the plurality of particular data, wherein the model includes relationships corresponding to each of the particular data, and wherein each of the plural relationship included for each particular data corresponds to respective different schemas.

Referring now to FIG. 2, an exemplary functional block diagram illustrating an embodiment of schema-independent access to objects in documents utilizing XML will be discussed and described. In this illustration, there is a model 201, a processor 203, and multiple documents, represented by document A 231 and document B 227. Document A is formatted according to schema X, whereas document B is formatted according to schema Y. Also illustrated is schema X 223 and schema Y 225, which are representative of multiple different schemas. Also illustrated is an executable program 205, which refers to the particular data A. In the illustrated document A 231 according to schema X, there is included a particular data A' represented by objects 233, 237; and in illustrated document B 227 according to schema Y there is included a particular data A" represented by objects 229, 235.

In this illustration, the schemas X and Y 223, 225 can include syntactic relationships for the particular data, here represented in simplified form by a relationship 207, 211; and a reference to ontological-element(s) 209, 213. In schema x 223, the syntactic relationship for particular data A is expressed as SX.E1.A1, where SX is Schema X, E1 is element 1, and A1 is attribute 1. In schema Y, the syntactic relationship for particular data A is expressed as SY.E1.A1, where SY is schema Y.

Furthermore, the relationships 209, 213 can reference the ontological-elements by including a list of one or more uniform resource identifiers (URI), or a pointer to the ontological-elements. For example, the reference to ontological-elements in Schema X 207 refers to (U3, U4), and the reference to ontological-elements in schema Y refers to (U1, U2).

It should be noted that the conventional XML schema descriptor (XSD) provides a field for describing an annotation, which can be utilized for the relationship 207, 211, and/or the reference to the ontological-elements.

Also, in this illustration the ontological-elements are represented by U1 215, U2 217, U3 219 and U4 221. Each of the ontological-elements can include an object, a subject, and a relationship, where the ontological-element defines a relationship between subject and object. The relationship can be, for example, "contains," "references," "means," or the like. The subject can conveniently be the ontological construct, e.g., the particular data. Hence, for ontological-element T1, object 1 (O1) has a relationship 1 (R1) to subject 1 (S1); for ontological-element T2, object (O2) has a relationship 1 (R2) to subject 2 (S2); for ontological-element T3, object 3 (O3) has a relationship 3 (R1) to subject 1 (S1); and for ontological-element T4, object 4 (O4) has a relationship 4 (R4) to subject 1 (S1). It will be appreciated that any combination of objects, subjects, and relationships can be provided.

Furthermore, one or more ontological-elements can be included in a logical and/or physical grouping, such as a file, an RDF (resource description framework) in which case the ontological-elements have the form of an RDF triplet, a map file, a topic map, or the like. One or more embodiments can provide that the ontological-elements are stored locally, remotely, or within the schema. Ontological-elements can be formatted in accordance with known techniques and known standards. Therefore, the ontological-element T1 included in UID (unique identifier) U1 215 is representative of one or more ontological-elements that can be provided at the UID. A UID is an identifier sufficient to locate a file, document, location within one of the foregoing, inside a pre-defined logical space; examples of UID include unique file names in a network, URLs in the Internet, addresses in a computer system, pointers within a file, and the like.

In the illustrated example, schema X 223 has been modified to include the syntactic relationship 207 for the particular data A (which will be the subject of the ontological-element) and the reference 209 to ontological-elements, which are included in the schema A as "SX.E1.A1 (U3, U4)." Similarly, schema Y has been modified to include the syntactic relationship for the particular data A and the reference to the ontological-elements as "SY.E1.A1 (U1, U2)." The schemas can be existing schemas which have been modified by being annotated to include the syntactic relationship; techniques are known for annotating schemas.

In this example, the executable program 205 can refer to the particular data A in a document which is formatted in accordance with the schema X 223; then refer to the syntactic relationship for the particular data A 207 (in schema A 223); then refer to the list of URIs 209 referring to the ontological-element(s) (U3, U4) for the particular data; then refer to the URIs (U3, U4) containing the ontological-element T3, T4 219, 221 indicated by the relationship. Then, the executable program 205 can refer to the objects O3 expected by schema X associated with document A 231 which is to be accessed. Similarly, if the executable program 205 refers to particular data A in document B, which is formatted in accordance with the schema Y 225, then the executable program would refer to the syntactic relationship 211 for schema Y, obtain the list of URI's (U1, U2) 213, reference ontological-elements U1, U2, determine that the subject for particular data A (in schema Y) is O1, and then refer to objects O1 in document B according to schema Y.

Accordingly, one or more embodiments includes choosing which of the different schemas corresponds to the document by the type of the document, wherein the relationship for the one of the different schemas is expressed in an XML schema corresponding to the one of the different schemas, wherein the relationship includes an annotation corresponding to the particular data, and the annotation includes the reference, and wherein accessing the model includes accessing the annotation for the particular data in the XML schema.

One or more embodiments can provide that the reference to the at least one ontological-elements is a pointer to a map file, that the relationship includes a syntactic description of the syntactic relationship of the particular data; that the map file includes the at least one ontological-element; that the configuration to access the particular data includes instructions in the executable program: to obtain the syntactic description and the semantic relationship, and to access the objects in the document as specified by the semantic relationship of the particular data.

Moreover, one or more embodiments can provide that the relationship is included in the schema and includes a uniform resource identifier ("URI"), the URI having a pointer to a resource description framework ("RDF") which includes the at least one ontological-element (triplet); and that accessing the particular data includes: obtaining the URI included in the relationship of the schema, accessing the RDF specified by the URI, and accessing the objects in the document as specified by the at least one triplet in the RDF.

Referring now to FIG. 3, another exemplary functional block diagram illustrating another embodiment of schema-independent access to objects in documents utilizing XML will be discussed and described. A concrete, but simplified and representative example is illustrated in FIG. 3.

Consider, for example, that different automobile manufacturers use documents that have different content formats to describe their respective automobiles. This content, although in different formats, can express analogous semantic relationships. For example, although documents from GM and BMW describe automobiles, they may describe automobiles and their components differently and the documents may be structured according to different schemas, such as illustrated schemas X and Y 323, 325.

In the illustrated example, an executable program 305 refers to a "steering wheel," an ontological concept which may (or may not) be used in schema X or Y 323, 325. For example, the executable program 305 might be intended to list documents which refer to things having steering wheels. Document A 331 refers to objects by terms including "car" 329 and "truck" 335; whereas document B 327 refers to objects by terms including "automobile" 333.

When the executable program 305 attempts to refer to "steering wheel" in document A, the computer system performs the following. The executable program 305 determines that document A is in schema X, for example in accordance with conventional techniques such as by checking the file extension and/or file descriptors. Then, the executable program 305 refers to the relationship 307 for "steering wheel," in this illustrating in schema X 323. Associated with the relationship is a list of URIs 309 which refer to ontological-elements, in this case, to ontological-element U3 319.

According to the relationship in ontological-element U3 319, "automobile" contains "steering wheel."

Thus, the executable program 305 can refer to the object "automobile" 333 in document A 331. The same process can be performed for document B; however, by referring to ontological-elements U1 and U2 as just described, the executable program can refer to the objects "car" 329 and "truck" 335 in document B 327. Consequently, there is no need to provide an executable program specific to each schema or version of schema.

Figure 4:
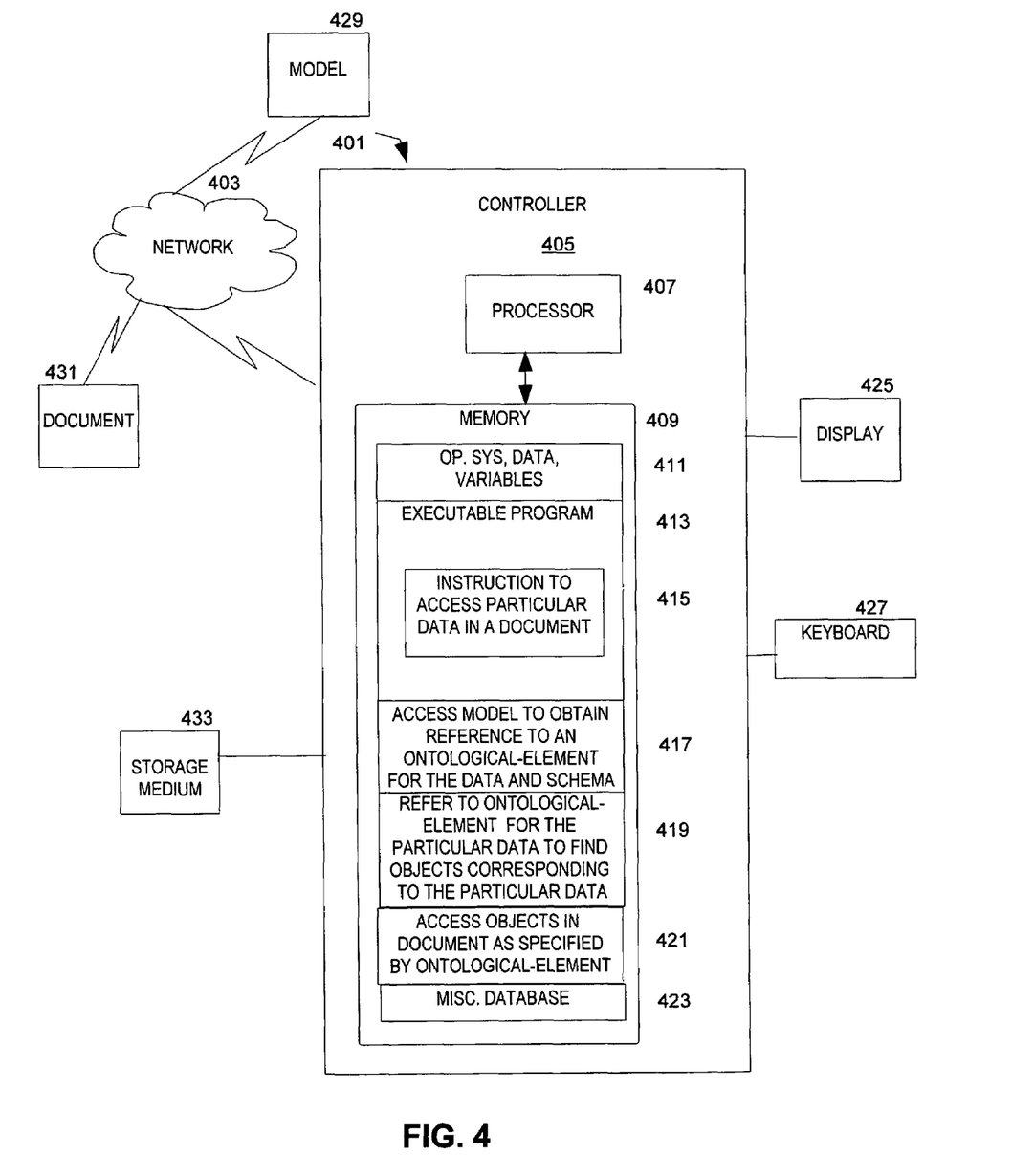
FIG. 4 is a diagram illustrating portions of an exemplary computer system.

Referring now to FIG. 4, a diagram illustrating portions of an exemplary computer system will be discussed and described. The computer system 401 can include one or more controllers 405. The controller 405 may include a processor 407, a memory 409, and other optional components, which will be well understood to those in this field.

The computer system 401 can communicate with a network 403 over input/output ports, as will be well understood. One or more documents, here represented by a document 431, and/or one or more models, here represented by a model 429, can be accessed over the network 403, and/or can be downloaded to the computer system 401, and/or can be on one or more locally accessible storage medium, here represented by a storage medium 433, and/or can be stored on the computer system such as in a miscellaneous database 423. Such networks 403 can include, by way of example, the Internet, intranets, local area networks (LAN), wireless LANs (WLAN), wide area networks (WAN), and others. Accordingly, one or more embodiments includes providing, on at the least one computer, the model.

The processor 407 may be, for example, one or more microprocessors and/or one or more digital signal processors. The memory 409 may be coupled to the processor 407 and may comprise a read-only memory (ROM), a random-access memory (RAM), a read/write flash memory, a programmable ROM (PROM), and/or an electrically erasable read-only memory (EEPROM). The memory 409 may include multiple memory locations for storing, among other things, an operating system, data and variables 411 for programs executed by the processor 407; computer programs for causing the processor to operate in connection with various functions such as described below; and the database 423 of various information used by the processor 407. The computer programs may be stored, for example, in ROM or PROM and may direct the processor 407 in controlling the operation of the computer system 401. Each of these computer programs is discussed by way of example below.

An executable computer program 413 can execute on the controller 405. The processor 407 also may be programmed for accessing 417 a model to obtain a reference to a ontological-element for the data and the schema; referring 419 to a ontological-element for the particular data to find object(s) corresponding to the particular data; and accessing 421 object(s) in the document as specified by the ontological-element(s). Additional details are provided below.

The processor can be programmed to include an executable computer program 413. The executable program can include one or more instructions 415 to access a particular data in a document, as well as other instructions as will be appreciated by one of skill in the art. More particularly, the executable program can be programmed to refer to a particular data by an ontological construct.

Accordingly, one or more embodiments provide that the particular data in the relationship includes a name, the name being unique for each particular data, and the name can be different from element and attribute names used by the different schemas. Further, the instructions to access the particular data can refer to the particular data by the name.

The processor 407 also may be programmed for accessing 417 a model to obtain a reference to a ontological-element for the data and the schema. More particularly, the instruction references the schema for DOCUMENT A, in accordance with known techniques. In this case, the schema is augmented to include the syntactic relationship for the ontological construct which is the particular data in the instruction.

Then, the processor 407 can be programmed for referring 419 to a ontological-element for the particular data to find object(s) corresponding to the particular data. For example, in accordance with conventional techniques, the schema contains a list of UID's; the processor 407 can obtain the contents of the UID's and can locate one or more ontological-elements having the particular data as the subject, and locates the objects in those ontological-elements.

The processor 407 can be programmed for accessing 421 object(s) in the document as specified by the ontological-element(s). Thus, the processor performs the action indicated by the instruction on the object(s) in the document.

Accordingly, one or more embodiments provides for executing the executable program, where the executable program includes the instruction(s) causing the objects in the document to be accessed, where the objects are referred to by the ontological construct (e.g., the particular data) rather than the name understood by the schema for the corresponding document.

It should be understood that various logical groupings of functions are described herein. Different realizations may omit one or more of these logical groupings. Likewise, in various realizations, functions may be grouped differently, combined, or augmented. For example, the interpretation of the schema when accessing the document can be handled in a file manager in the operating system; the accessing of the model 417, the referring to the ontological-element 419, and/or the accessing of the objects 421 in the document can be distributed throughout various layers of the operating system and/or file handling system in the processor 407 in different realizations. Similarly, the present description may describe or suggest a database or collection of data and information. One or more embodiments can provide that the database or collection of data and information can be distributed, combined, or augmented, or provided locally (as illustrated) and/or or remotely (not illustrated).

Figure 5:
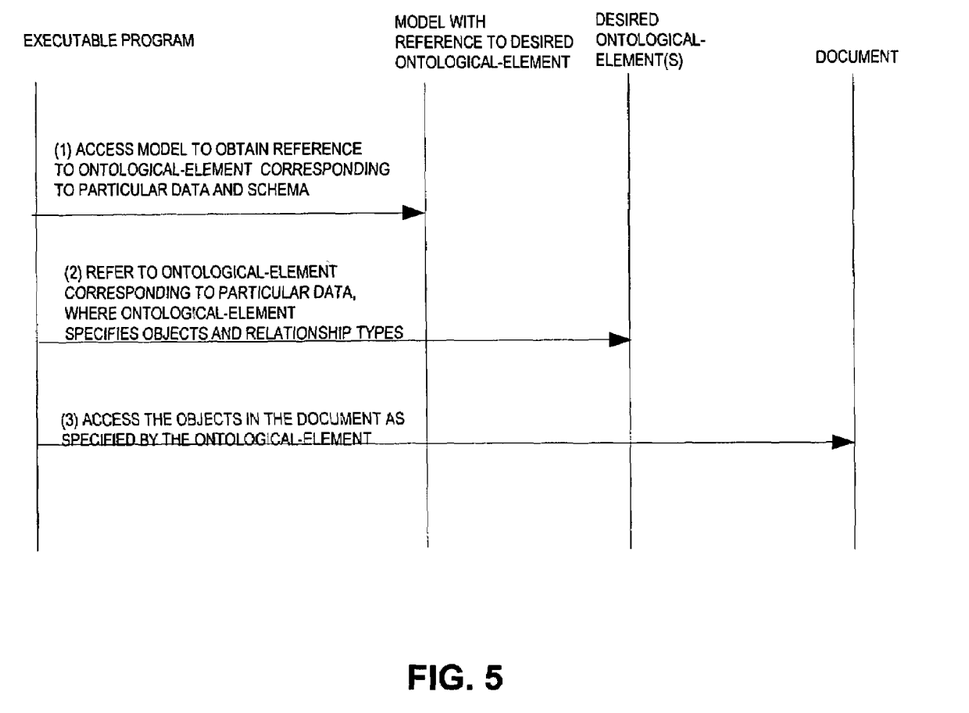
FIG. 5 is a flow diagram illustrating an exemplary accessing of a document.

Referring now to FIG. 5, a flow diagram illustrating an exemplary accessing of a document will be discussed and described. In order to clarify the order of accessing the syntactic relationship, the bridge, and the semantic relationship, a flow is shown between an executable program, a model having a reference to one or more desired ontological-elements, the desired ontological-element(s), and the document to be accessed.

At step 1, an executable program accesses a model to obtain a reference to one or more ontological-elements corresponding to a particular data as well as the schema for a document to be accessed. The model can be accessed as described above in more detail, for example in connection with a description of the syntactic relationship. The reference acts as a bridge from the syntactic relationship to the semantic relationship. The model can be accessed in response to a step in the executable program which instructs the computer to access the particular data.

At step 2, the executable program then uses the reference to the one or more ontological-elements to refer to the ontological-element corresponding to the particular data. As described above in more detail, for example in connection with the semantic relationship, the ontological-element further specifies the object as well as the type of relationship between the object and the particular data.

At step 3, the executable program then uses the object (from step 2) to access objects in the document, as specified by the ontological-element. Again, this has been described in greater detail above.

The executable program can repeats steps 1, 2 and 3 for other documents. The ontological-element might differ, and thus the objects might differ, particularly where the other documents use different schemas. Accordingly, the executable program can execute an instruction with a reference to a single ontological construct, which ultimately resolves to multiple different objects for documents which are structured according to different schemas.

Figure 6:
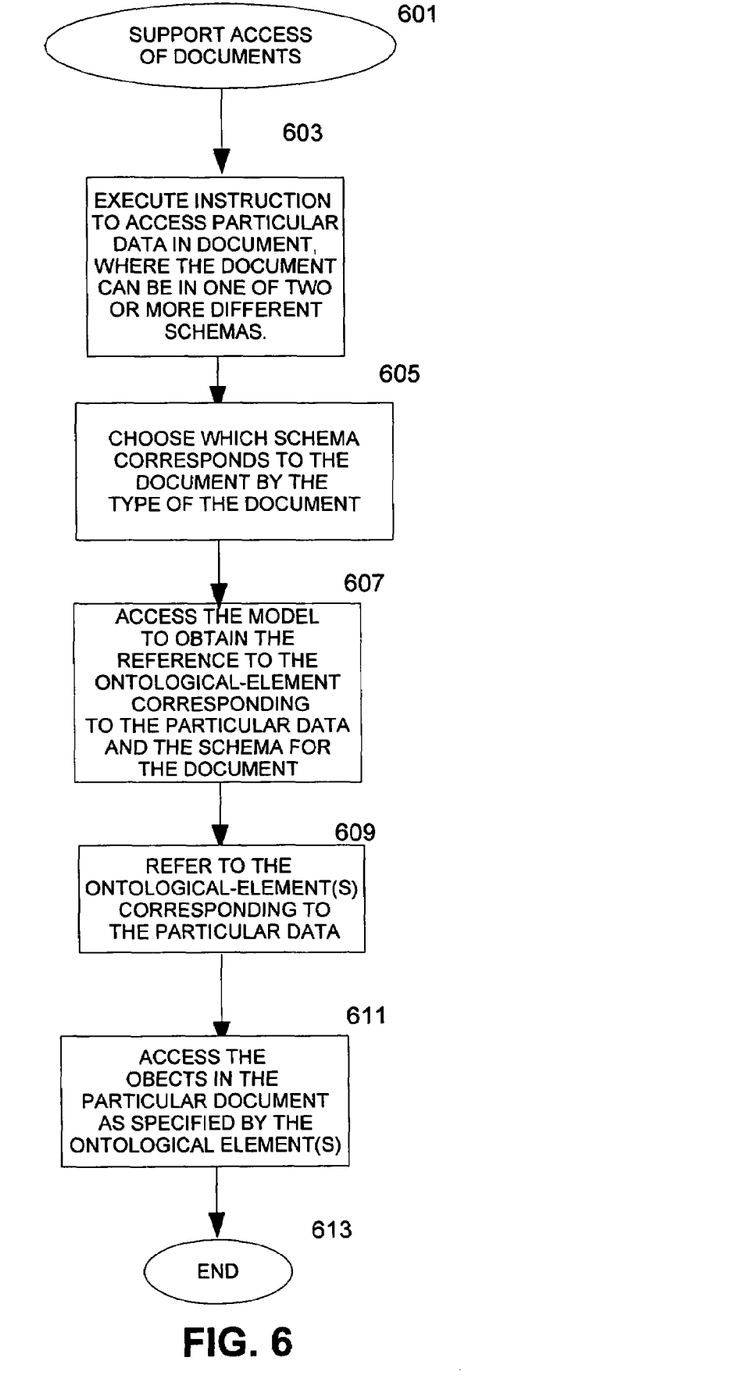
FIG. 6 is a flow chart illustrating an exemplary procedure for supporting the access of documents.

Referring now to FIG. 6, a flow chart illustrating an exemplary procedure for supporting the access of documents will be discussed and described. The procedure 601 can advantageously be implemented on, for example, a processor of a controller, described in connection with FIG. 4 or other apparatus appropriately arranged.

The procedure 601 supporting the access of documents can include, in overview, executing 603 an instruction to access a particular data in a document; choosing 605 which schema corresponding to the document; accessing 607 the model to obtain the reference to a ontological-element for the particular data; referring 609 to the ontological-element(s) corresponding to the particular data; and accessing 611 the object(s) in the document specified by the ontological-element(s). Each of these is described below in more details.

The process can execute 603 an instruction to access a particular data in a document, where the document can be in one of two or more different schemas. The program which is executing can include an instruction to refer to a particular data in a document. Upon executing that instruction, the process or the support processes (e.g., in the file manager, document manager, or operating system) can continue with the steps described below.

The process can choose 605 which schema corresponds to the document by the type of document. Conventional techniques are known for determine which schema corresponds to a given documents. These conventional techniques can be sued for determining the schema that corresponds to a desired document.

The process can access 607 the model to obtain the reference to a ontological-element for the particular data, which further corresponds to the schema that is used for the document. For example, the schema which corresponds to the document can include an annotation for the particular data, where the annotation includes the reference to the ontological-element. Conveniently, the reference to the ontological-element can be a UID, which will uniquely identify a storage construct where the ontological-elements are stored as data, such as a file, document, or list that contains the semantic relationships. Ontological-elements can be stored in any convenient distribution amongst these storage constructs.

Then, the process can refer 609 to the ontological-element(s) corresponding to the particular data, by accessing the storage construct(s) by the UID(s). The ontological-element indicates the object corresponding to the particular data.

Then, the process can access 611 the object(s) in the document specified by the ontological-element(s), where the object corresponds to the particular data but is expressed in accordance with the schema corresponding to the document. Finally, the procedure for accessing the particular data in the document can end 613, and the rest of the normal processing can continue.

Accordingly, there can be provided a computer-implemented method, implemented on at least one computer, for supporting the access of documents. A document can be formatted according to one of a plurality of different schemas. A schema can specify at least syntactic relationships, structure, and element and attribute names by which to interpret a document. A model can include a relationship for the different schemas, the relationship being configured to specify a particular data and, corresponding to the particular data and one of the different schemas, a reference to one or more ontological-elements. The ontological-element can define a semantic relationship between data as subjects and objects in documents. The computer-implemented method can include executing an instruction to access a particular data in a document, the document being formatted according to one of at least two different schemas. Accessing the particular data in the document can include accessing the model to obtain the reference to the at least one ontological-element corresponding to the particular data and the one of the different schemas; referring to the at least one ontological-element corresponding to the particular data, the at least one ontological-element further specifying the objects corresponding to the particular data; and accessing the objects in the particular document as specified by the at least one ontological-element.

Furthermore, one or more embodiments provide an apparatus configured to perform the above process.

It should be noted that the schemas of interest include those that specify syntactic relationships, structure, and element and attribute names for use in interpreting documents. Such schemas include those addressed to document and/or data structure, document styles, document content presentation and user interfaces, metadata, and data exchange, and can include, by way of example, XML (extensible markup language) 1.0, XML 1.1, Namespaces in XML (W3C Recommendation), SGML (Standard Generalized Markup Language), XSL 1.0 (extensible style sheet language), XHTML 1.0 (extensible hypertext markup language), SMIL 1.0 (synchronized multimedia synchronization language), RSS 0.91 (Rich Site Summary), CDF (Channel Definition Format), WebDAV (Web-based Distributed Authoring and Versioning), analogous schemas, and extensions, improvements and variations thereof. Related to schemas are standards which are of interest including RDF Vocabulary Description Language 1.0, RDF Schema (RDF-S), Web Ontology Language (OWL), Topic Maps (ISO 13250:2000).

Furthermore, the term URI denotes a string, typically short, which identifies a resource in a network such as the Internet or an intranet, for example, a document, an image, a downloadable file, a service, an electronic mailbox, and other resources. A URI makes a resource available under a variety of naming schemes and access methods such as HTTP (hypertext transfer protocol), FTP (file transfer protocol), and Internet mail addressable in the same simple way. A URI is sometimes referred to as a URL (uniform resource locator).

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system supporting the access of documents, wherein a document can be formatted according to one of a plurality of different schemas, wherein a schema specifies at least syntactic relationships, structure, and element and attribute names by which to interpret documents, comprising:
  (A) a model configured to include a relationship for at least two different schemas, wherein the relationship is configured to specify a particular data and, corresponding to the particular data and one of the different schemas, a reference to at least one ontological-element, wherein the at least one ontological-element defines a semantic relationship between the particular data as subject and objects in documents; and
  (B) a processor configured with an executable program, wherein the executable program includes instructions to access the particular data in a document, the document being formatted according to the one of the different schemas, wherein to access the particular data in the document, the executable program is configured to:
  access the model to obtain the reference to the at least one ontological-element corresponding to the particular data and the one of the different schemas,
  refer to the at least one ontological-element corresponding to the particular data, the at least one ontological-element further specifying the objects corresponding to the particular data, and
  access the objects in the particular document as specified by the at least one ontological-element.

2. The computer system of claim 1, further comprising:
choosing which of the different schemas corresponds to the document by the type of the document,
wherein the relationship for the one of the different schemas is expressed in an XML schema corresponding to the one of the different schemas,
wherein the relationship includes an annotation corresponding to the particular data, and the annotation includes the reference,
wherein accessing the model includes accessing the annotation for the particular data in the XML schema.

3. The computer system of claim 1,
wherein the reference to the at least one ontological-elements is a pointer to a map file,
wherein the relationship includes a syntactic description of the syntactic relationship of the particular data;
wherein the map file includes the at least one ontological-element;
wherein the configuration to access the particular data includes instructions in the executable program:
  to obtain the syntactic description and the semantic relationship, and
  to access the objects in the document as specified by the semantic relationship of the particular data.

4. The computer system of claim 1,
wherein the relationship is included in the schema and includes a uniform resource identifier ("URI"), the URI having a pointer to a resource description framework ("RDF") which includes the at least one ontological-element,
wherein the configuration to access the particular data is further configured:
  to obtain the URI included in the relationship of the schema,
  to access the RDF specified by the URI, and
  to access the objects in the document as specified by the at least one ontological-element in the RDF,
wherein the ontological-element is a triplet.

5. The computer system of claim 1,
wherein the particular data in the relationship includes a name, the name being unique for each particular data, the name can be different from element and attribute names used by the different schemas,
wherein the instructions to access the particular data refer to the particular data by the name.

6. The computer system of claim 5,
wherein there are a plurality of particular data including the particular data,
wherein the executable program includes instructions to access the plurality of particular data,
wherein the model includes relationships corresponding to each of the particular data,
wherein each of the plural relationship included for each particular data corresponds to respective different schemas.

7. A computer-implemented method, implemented on at least one computer, for supporting the access of documents, wherein a document can be formatted according to one of a plurality of different schemas, wherein a schema specifies at least syntactic relationships, structure, and element and attribute names by which to interpret a document, wherein a model includes a relationship for the different schemas, the relationship being configured to specify a particular data and, corresponding to the particular data and one of the different schemas, a reference to one or more ontological-elements, where the ontological-element defines a semantic relationship between data as subjects and objects in documents, the method comprising:
  executing an instruction to access a particular data in a document, the document being formatted according to one of at least two different schemas, wherein accessing the particular data in the document includes:
    accessing the model to obtain the reference to the at least one ontological-element corresponding to the particular data and the one of the different schemas;
    referring to the at least one ontological-element corresponding to the particular data, the at least one ontological-element further specifying the objects corresponding to the particular data; and
    accessing the objects in the particular document as specified by the at least one ontological-element.

8. The method of claim 7, further comprising:
choosing which of the different schemas corresponds to the document by the type of the document,
wherein the relationship for the one of the different schemas is expressed in an XML schema corresponding to the one of the different schemas,
wherein the relationship includes an annotation corresponding to the particular data, and the annotation includes the reference,
wherein accessing the model includes accessing the annotation for the particular data in the XML schema.

9. The method of claim 7, further comprising:
choosing which of the different schemas corresponds to the document,
wherein the reference to the at least one ontological-element is a pointer to a map file, wherein the relationship includes a syntactic description of the syntactic relationship of the particular data;
wherein the map file includes the at least one ontological-element;
wherein accessing the particular data includes executing instructions in the executable program:
  to obtain the syntactic description and the semantic relationship, and
  to access the objects in the document as specified by the semantic relationship of the particular data.

10. The method of claim 7,
wherein the relationship is included in the schema and includes a uniform resource identifier ("URI"), the URI having a pointer to a resource description framework ("RDF") which includes the at least one ontological-element,
wherein accessing the particular data includes:
  obtaining the URI included in the relationship of the schema,
  accessing the RDF specified by the URI, and
  accessing the particular data in the document as specified by the at least one ontological-element in the RDF,
wherein the ontological-element is a triplet.

11. The method of claim 7,
wherein the particular data in the relationship includes a name, the name being unique for each particular data, the name can be different from element and attribute names used by the different schemas,
wherein the instruction to access the particular data refers to the particular data by the name.

12. The method of claim 11,
wherein there are a plurality of particular data including the particular data,
wherein there are a plurality of instructions which are executed, including instructions to access the plurality of particular data,
wherein the model includes relationships corresponding to each of the particular data,
wherein each of the plural relationships included for each particular data corresponds to respective different schemas.

13. The method of claim 7, further comprising executing the executable program.

14. An apparatus configured to perform the method of claim 7.

15. A computer readable storage medium comprising executable instructions for performing the method of claim 7.

16. A computer-readable storage medium comprising instructions for execution by a computer, the instructions including a computer-implemented method for supporting the access of documents, wherein a document can be formatted according to one of a plurality of different schemas, wherein a schema specifies syntactic relationships, structure, and element and attribute names by which to interpret a document, the instructions for implementing:
  accessing a particular data in a document, the document being formatted according to one of at least two different schemas, wherein accessing the particular data in the document includes:
    accessing a model to obtain a reference to a ontological-element corresponding to the particular data and one of the different schemas, the model including a relationship for at least two different schemas, wherein the relationship is configured to specify a particular data and, corresponding to the particular data and one of the different schemas, a reference to at least one ontological-element, wherein the at least one ontological-element defines a semantic relationship between particular data as subject and objects in documents;
    referring to the at least one ontological-element corresponding to the particular data, the at least one ontological-element further specifying the objects corresponding to the particular data; and
    accessing the objects in the particular document as specified by the at least one ontological-element.

17. The computer-readable storage medium of claim 16, further comprising providing, on at the least one computer, the model.

18. The computer-readable storage medium of claim 16, further comprising:
  choosing which of the different schemas corresponds to the document by the type of the document,
  wherein the relationship for the one of the different schemas is expressed in an XML schema corresponding to the one of the different schemas,
  wherein the relationship includes an annotation corresponding to the particular data, and the annotation includes the reference,
  wherein accessing the model includes accessing the annotation for the particular data in the XML schema.

19. The computer-readable storage medium of claim 16,
wherein the reference to the at least one ontological-element is a pointer to a map file,
wherein the relationship includes a syntactic description of the syntactic relationship of the particular data;
wherein the map file includes the at least one ontological-element;
wherein the instructions for accessing the particular data include:
  obtaining the syntactic description and the semantic relationship, and
  accessing the objects in the document as specified by the semantic relationship of the particular data.

20. The computer-readable storage medium of claim 16,
wherein the relationship is included in the schema and includes a uniform resource identifier ("URI"), the URI having a pointer to a resource description framework ("RDF") which describes an XML annotation in the schema
wherein instructions for accessing the particular data include:
  obtaining the URI included in the relationship of the schema,
  accessing the RDF specified by the URI, and
  accessing the objects in the document as specified by the at least one ontological-element in the RDF,
wherein the ontological-element is a triplet.

21. The computer-readable storage medium of claim 16,
wherein the particular data in the relationship includes a name, the name being unique for each particular data, the name can be different from element and attribute names used by the different schemas,
wherein the instructions for accessing the particular data refer to the particular data by the name.

22. The computer-readable storage medium of claim 16, further comprising instructions for accessing a plurality of particular data including the particular data,
wherein the model includes relationships corresponding to each of the particular data,
wherein each of the plural relationships included for each particular data corresponds to respective different schemas.

* * * * *